United States Patent [19]

Trapy

[11] Patent Number: 5,014,662
[45] Date of Patent: May 14, 1991

[54] DEVICE FOR CONTROLLING THE JET OF CARBURETTED MIXTURE DELIVERED BY A PNEUMATIC INJECTION SYSTEM

[75] Inventor: Jean Trapy, Rueil Malmaison, France

[73] Assignees: Institut Francais du Petrole, Rueil Malmaison; Automobiles Peugeot, Paris; Automobiles Citroen, Neuilly sur Seine, all of France

[21] Appl. No.: 559,072

[22] Filed: Jul. 30, 1990

Related U.S. Application Data

[63] Continuation of Ser. No. 814,883, Dec. 30, 1985, abandoned.

[30] Foreign Application Priority Data

Dec. 28, 1984 [FR] France .............................. 84 20058

[51] Int. Cl.⁵ ............................................. F02M 61/18
[52] U.S. Cl. ...................................... 123/250; 123/531
[58] Field of Search ............... 123/250, 251, 252, 292, 123/531

[56] References Cited

U.S. PATENT DOCUMENTS

| 408,460 | 8/1889 | Capitaine | 123/531 |
| 1,066,768 | 7/1913 | Vogt | 123/531 |
| 4,210,105 | 7/1980 | Nohira et al. | 123/250 |

FOREIGN PATENT DOCUMENTS

| 359399 | 9/1922 | Fed. Rep. of Germany . | |
| 408383 | 1/1925 | Fed. Rep. of Germany | 123/531 |
| 895790 | 2/1945 | France | 123/250 |
| 901122 | 7/1945 | France . | |
| 46867 | 3/1918 | Sweden | 123/252 |
| 270337 | 11/1950 | Switzerland . | |
| 8069 | of 1891 | United Kingdom | 123/250 |
| 708807 | 5/1954 | United Kingdom | 123/250 |

Primary Examiner—Andrew M. Dolinar
Attorney, Agent, or Firm—Antonelli, Terry, Stout & Kraus

[57] ABSTRACT

A device for supplying a reciprocating internal combustion engine with a carburetted mixture. The device includes an injection orifice provided with a deflecting arrangement for deflecting a jet of the carburetted mixture delivered by a pneumatic injection system from a prechamber into a combustion chamber of the internal combustion engine through the injection orifice.

6 Claims, 1 Drawing Sheet

DEVICE FOR CONTROLLING THE JET OF CARBURETTED MIXTURE DELIVERED BY A PNEUMATIC INJECTION SYSTEM

This is a continuation of application Ser. No. 814,883, filed Dec. 30, 1985 now abandoned.

BACKGROUND OF THE INVENTION

1. Field of the Invention

The present invention relates to a device for shaping and directing a jet of carburetted mixture delivered by a pneumatic injector, feeding a reciprocating internal combustion engine.

2. Description of the Prior Art

These engines are usually fed either by a carburetor, or by a direct or indirect injection of the liquid fuel.

In the first case, the prior mixture of air and fuel takes place appreciably upstream of the intake ports of the cylinders, which causes inhomogeneities both in the distribution of the fuel in the air and in the distribution of the mixture between the cylinders. These imperfections adversely affect the efficiency of the engine, since the mixture may be exhausted when the cylinder is scavenged by the mixture admitted (in particular in two stroke engines). Finally, control of the amount of fuel in the air becomes very delicate when the carburetion must be optimized with a view to saving energy and reducing pollutants.

Direct or indirect injection of the liquid fuel reduces the harmful effects of poor distribution between the cylinders and losses to the exhaust, and facilitates fuel control. It has however disadvantageous in that inhomogeneities of the mmixture are created in the cylinders, which may cause poor combustion, particularly at high speeds.

A third method is little used or not used at all in reciprocating engines, namely pneumatic injection. This process combines the advantages of direct or indirect liquid injection with those of carburetion. In fact, the fluid introduced is already a carburetted mixture, and distribution thereof may be independent for each cylinder and determined so as to minimize the losses to the exhaust.

In the prior art there exists no device for shaping a jet penetrating into a combustion chamber in which there already exists a certain movement, for example a swirling movement of the charge contained in this chamber. Examples of devices for obtaining an overall swirling movement of the charge area described in French patent FR-A-313 652 and FR-A-1 520 353, in the English patent GB-882 706 and in the U.S. Pat. No. 1,866,703.

SUMMARY OF THE INVENTION

The present invention provides the modeling of the jet, produced by a pneumatic injector, penetrating into a combustion chamber in which the essential part of the charge has been introduced by an appropriate means separate from the pneumatic injector.

The invention provides then a deflector disposed at the outlet of a pneumatic injector for modifying at will the shape and the direction of the jet of the carburetted mixture.

Thus, the present invention provides a device for controlling the jet of carburetted mixture delivered by a pneumatic injection system feeding a reciprocating internal combustion engine, with the pneumatic injection system comprising a means for injecting the liquid fuel opening into an injection prechamber communicating with the combustion chamber of the engin through an injection orifice equipped with a periodic closure means, such as an injection valve. This device is characterized in that the intake port is equipped with a means for deflecting the jet of carburetted mixture delivered by the pneumatic injection system.

This means may be integrated with or adapted to the seat of the injection valve. It may have a shape whose internal wall comprises a first portion widening out towards the inside of the combustion chamber of the engine, this first wall portion being connected to a second portion substantially parallel to the axis of the injection valve.

The deflector means may have a form comprising a first internal wall portion opening out towards the inside of the combustion chamber of the engine, this first wall portion being connected to a second portion of rounded shape.

The deflector means may have a shape opening out towards the inside of the combustion chamber of the engine.

Finally, the deflector means may have an axis slanted with respect to the axis of the injection orifice so as to create a deflected intake jet.

BRIEF DESCRIPTION OF THE DRAWINGS

The above and other features and advantages of the present invention become more apparent from the following description when taken in connection with the accompanying drawings which show, for the purposes of illustration only, several embodiments in accordance with the present invention, and wherein.

DETAILED DESCRIPTION

Figure 1:
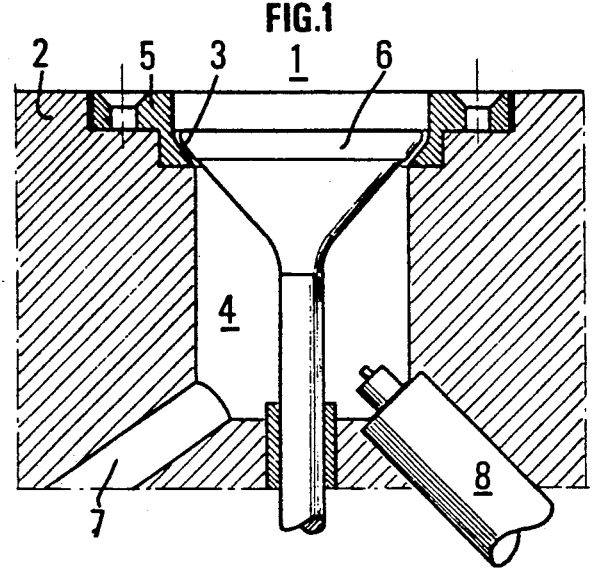
FIG. 1 is a partially schematic cross-sectional view of one embodiment of the injection device provided with a deflector.

In the drawings, a combustion chamber 1 of a reciprocating internal combustion engine includes a cylinder head 2 comprising an injection orifice 3 for communicating an injection prechamber 4 with the combustion chamber 1.

In FIG. 1 a pneumatic injector is equipped with a deflector 5, with the deflector 5 being disposed in an end position at the outlet of a injector, while being integrated (or not) in the seat of the injection valve 6, which closes the injection prechamber 4. A pressurized air intake 7 communicates with the prechamber 4, as well as one or more liquid fuel injectors 8 such, for example, as those at present used in fuel injection engines. The injection valve 6, whose movement is controlled by conventional systems or not, when it lifts causes the injector to open and a carburetted mixture to be injected, for an air flow is then established through the prechamber 4, which sprays the fuel and drives it to the outside. The liquid fuel is introduced into the prechamber before and/or during opening of the valve. Still within the scope of the invention, the injection valve 6 may be replaced by any other type of periodic closure means.

FIGS. 2A, 2B, 2C and 2D show embodiments of the deflector, and it has been verified experimentally that the shape and direction of the jet were indeed imposed by that of the deflector. Thus, the deflector 5a of FIG. 2A comprises a first wall portion 9 which widens out towards the inside of chamber 1, this first wall portion being joined to a second portion substantially parallel to the axis of valve 6, so as to create a straight jet. The deflector 5b (FIG. 2B) also comprises a divergent wall portion 9, but this is connected to a second portion 11 which has a rounded shape so as to create a jet which contracts, which means that the jet penetrates more deeply into chamber 1 and is therefore advantageous for large sized chambers. Deflector 5c of FIG. 2C creates a jet which opens out, and deflector 5d (FIG. 2D) creates a deflected jet in the direction shown by the arrow.

Figure 2A:
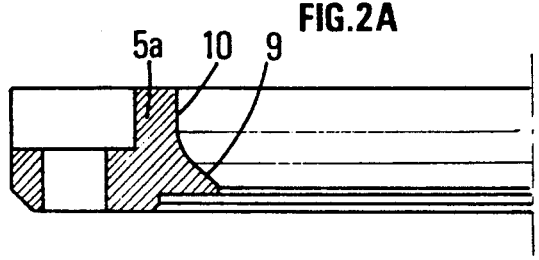
FIGS. 2A, 2B, 2C and 2D are partial cross-sectional views of additional embodiments of deflectors for an injection device constructed in accordance with the present invention.
Figure 2B:
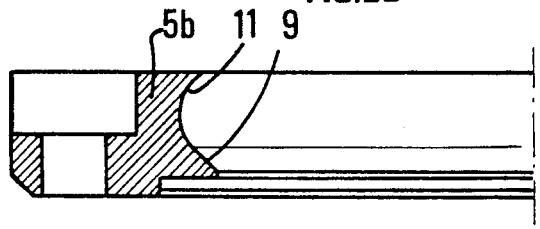
Figure 2C:
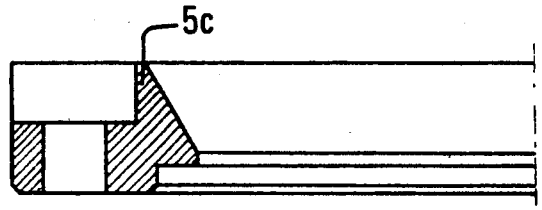

The embodiment shown in FIG. 2C is advantageous for small sized chambers, for it avoids too deep a penetration of the jet and promotes mixture thereof with the ambient air.

Figure 2D:
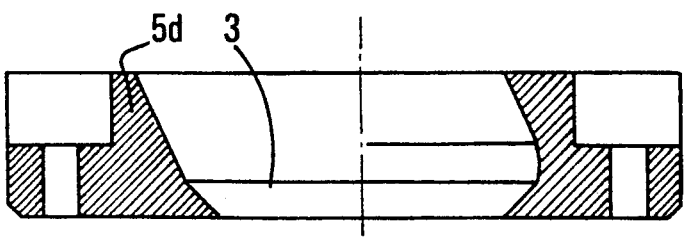

The embodiment shown in FIG. 2D, in which the axis of the deflector is slanted with respect to that of the injection orifice, may be used so as to give the jet an orientation moving it away from the exhaust port or ports, which improves retention of the carburetted mixture of chamber 1. This embodiment is particularly advantageous in two stroke engines comprising exhaust ports.

What is claimed is:

1. A device for controlling a jet of carburetted mixture supplied to a reciprocating internal combustion engine by a pneumatic injection system, the pneumatic injection system comprising injection prechamber means including an injection opening formed in a wall of a combustion chamber of the internal combustion engine for communicating said injection prechamber means with the combustion chamber, means for injecting liquid fuel into the injection prechamber means, an injection valve means for periodically opening and closing said injection opening, a ring-shaped valve seat element mounted in said injection opening so as to be substantially flush with the wall of the combustion chamber and cooperating with said injection valve means, deflector means provided on said valve seat element for deflecting the jet of carburetted mixture from the injection prechamber means through said injection opening directly into the combustion chamber.

2. The device as claimed in claim 1, wherein said deflector means is formed as one piece with the valve seat element.

3. The device as claimed in one of claims 1 or 2, wherein said deflector means includes an internal wall comprising a first wall portion widening outwardly from a prechamber side thereof toward a combustion chamber side thereof, said first wall portion merging into a second wall portion substantially parallel to a longitudinal center axis of the injection valve means such that a substantially straight jet of carburetted mixture is injected into the combustion chamber through said injection opening.

4. The device as claimed in one of claims 1 or 2, wherein said deflector means includes a first internal wall portion widening outwardly from a prechamber means side thereof toward a combustion chamber side thereof, said first wall portion merging into a second wall portion of a rounded shape such that a contracted jet of carburetted mixture is injected into the combustion chamber through said injection opening so as to enable a jet of carburetted mixture to deeply penetrate the combustion chamber.

5. The device as claimed in one of claims 1 or 2, wherein said deflector means includes an internal wall widening outwardly from a prechamber means side thereof toward a combustion chamber side thereof such that a widened jet of carburetted mixture is injected into the combustion chamber through said injection opening.

6. The device as claimed in one of claims 1 or 2, wherein said deflector means includes an internal wall slanted with respect to a longitudinal center axis of the injection opening so as to inject a deflected jet of carburetted mixture through said injection opening into said combustion chamber.

* * * * *